United States Patent
Leonardi et al.

(10) Patent No.: US 11,545,866 B2
(45) Date of Patent: Jan. 3, 2023

(54) STATOR FOR ELECTRIC MACHINE WITH MULTI-PART CONDUCTOR ASSEMBLY

(71) Applicant: Ford Global Technologies, LLC, Dearborn, MI (US)

(72) Inventors: Franco Leonardi, Dearborn Heights, MI (US); Becky Sue Morris, Canton, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 192 days.

(21) Appl. No.: 17/135,664

(22) Filed: Dec. 28, 2020

(65) Prior Publication Data

US 2022/0209606 A1 Jun. 30, 2022

(51) Int. Cl.
*H02K 3/28* (2006.01)
*H02K 3/50* (2006.01)
*H02K 1/16* (2006.01)

(52) U.S. Cl.
CPC .............. *H02K 3/28* (2013.01); *H02K 1/16* (2013.01); *H02K 3/50* (2013.01); *H02K 2203/09* (2013.01)

(58) Field of Classification Search
CPC ......... H02K 3/28; H02K 1/16; H02K 2203/09
See application file for complete search history.

(56) References Cited

U.S. PATENT DOCUMENTS

| | | | | |
|---|---|---|---|---|
| 4,321,497 A * | 3/1982 | Long | ........................ | H02K 3/12 310/260 |
| 6,870,294 B2 * | 3/2005 | Holzheu | .................. | H02K 3/28 310/201 |
| 8,508,088 B2 * | 8/2013 | Sugiyama | ................ | H02K 3/50 310/260 |
| 9,362,793 B2 * | 6/2016 | Iki | ............................. | H02K 3/28 |
| 9,362,809 B2 * | 6/2016 | Kishi | ..................... | H02K 3/345 |
| 11,228,216 B2 * | 1/2022 | Leonardi | .................. | H02K 3/12 |
| 11,283,323 B2 * | 3/2022 | Dunn | ....................... | H02K 3/30 |
| 11,316,396 B2 * | 4/2022 | Shiraki | .................... | H02K 3/47 |
| 11,381,126 B1 * | 7/2022 | Thomasson | ............. | H02K 3/24 |
| 2013/0200743 A1 * | 8/2013 | Okimitsu | ................. | H02K 3/12 310/201 |
| 2015/0076051 A1 | 3/2015 | Provo et al. | | |
| 2015/0076951 A1 | 3/2015 | Lynch et al. | | |
| 2016/0285334 A1 | 9/2016 | Turnbull et al. | | |
| 2017/0288318 A1 * | 10/2017 | Neet | ........................ | H02K 3/50 |
| 2018/0205285 A1 | 7/2018 | Huang et al. | | |
| 2020/0295633 A1 * | 9/2020 | Hendricks | ................ | H02K 3/50 |
| 2021/0249915 A1 * | 8/2021 | Degner | ............. | H02K 15/0068 |
| 2022/0209606 A1 * | 6/2022 | Leonardi | .................. | H02K 3/50 |

FOREIGN PATENT DOCUMENTS

EP 2606561 B1 10/2014

* cited by examiner

*Primary Examiner* — Robert W Horn
(74) *Attorney, Agent, or Firm* — David B. Kelley; Brooks Kushman P.C.

(57) ABSTRACT

A winding assembly for a stator has a plurality of bridges each including an arcuate center section extending circumferentially over an end surface of a core at a first axial level relative thereto, first and second necks contiguous with respective first and second ends of the center section and extending therefrom axially away from the end surface, and first and second blocks contiguous with the respective necks and connected to the respective terminals of a pair of conductors at a second axial level farther from the end surface than the first axial level.

18 Claims, 14 Drawing Sheets

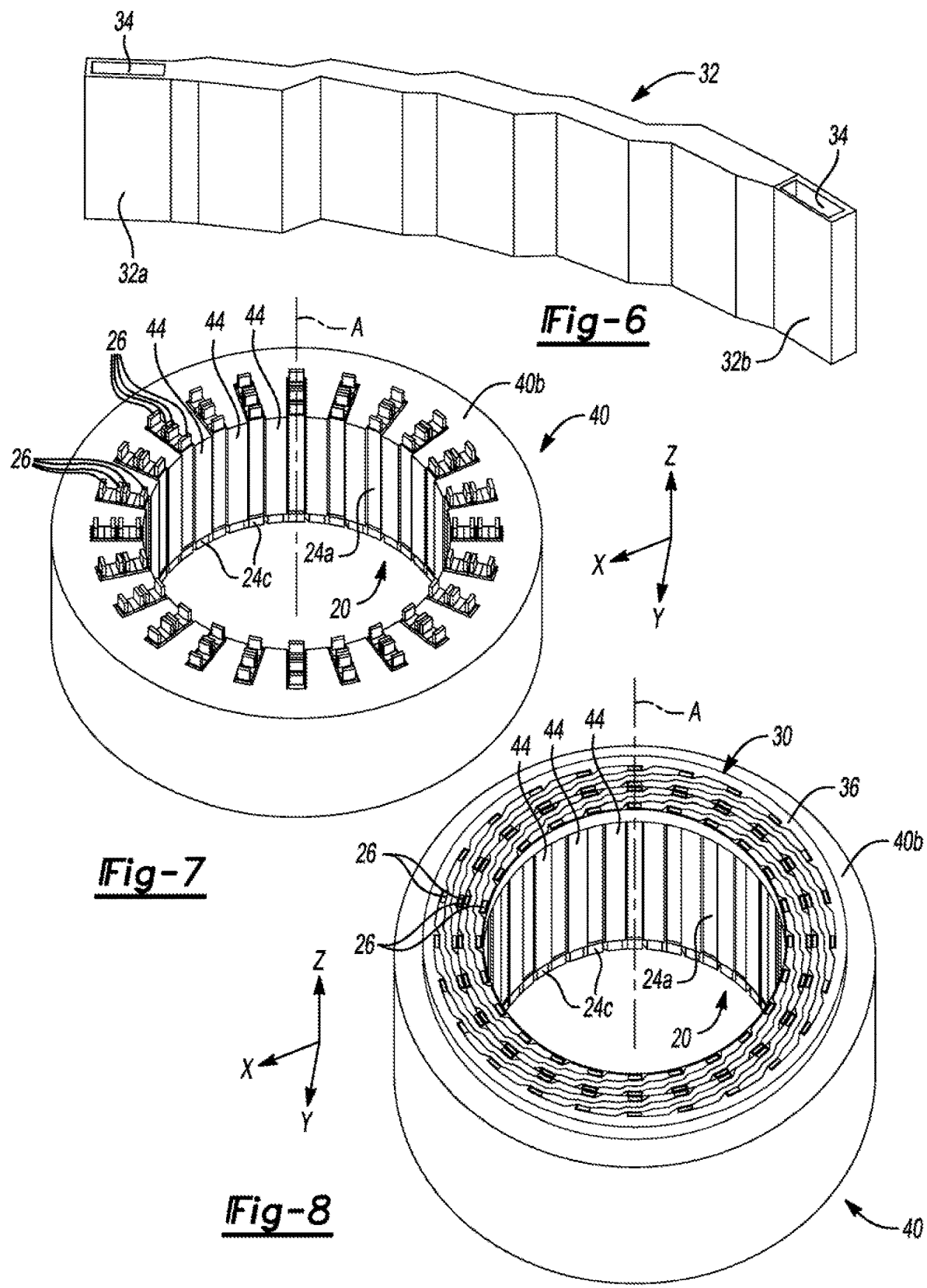

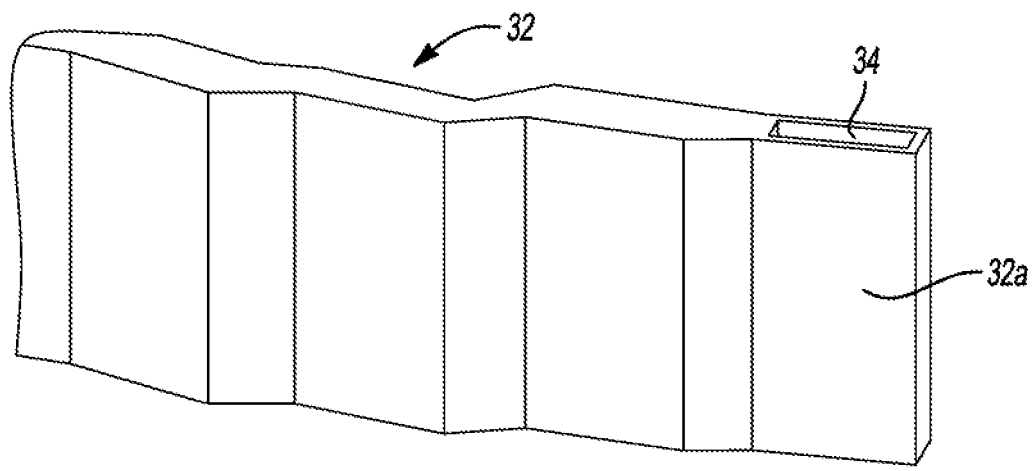
*Fig-9A*
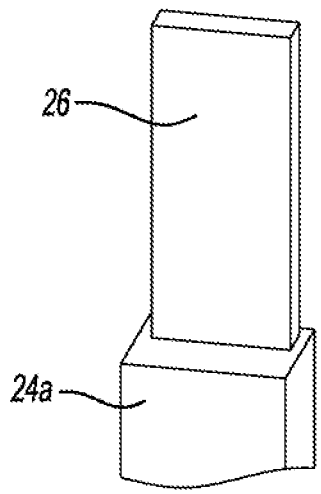
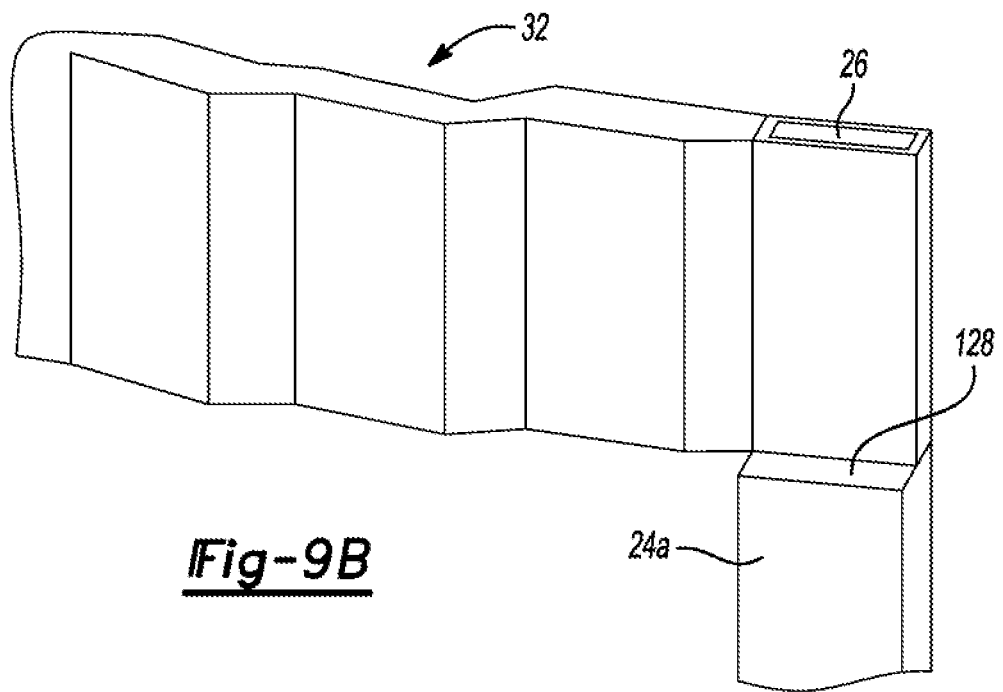
*Fig-9B*

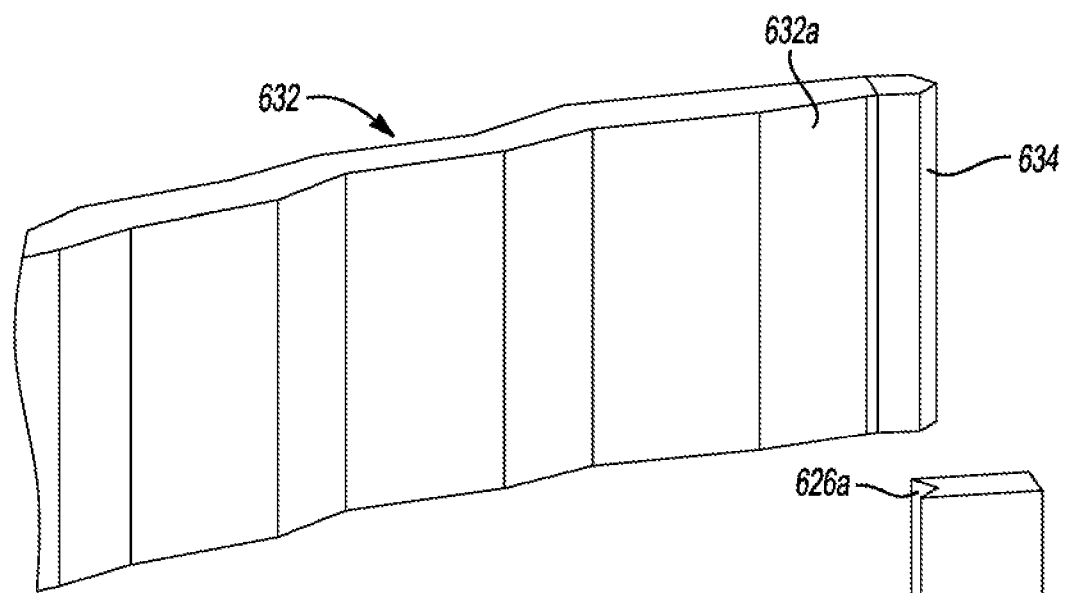
Fig-9C
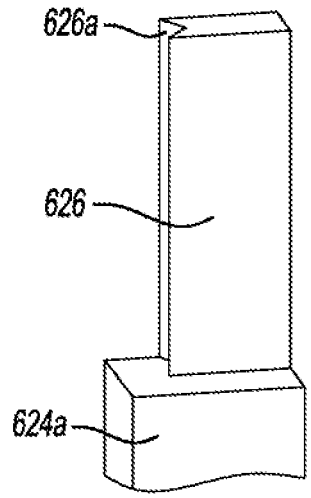
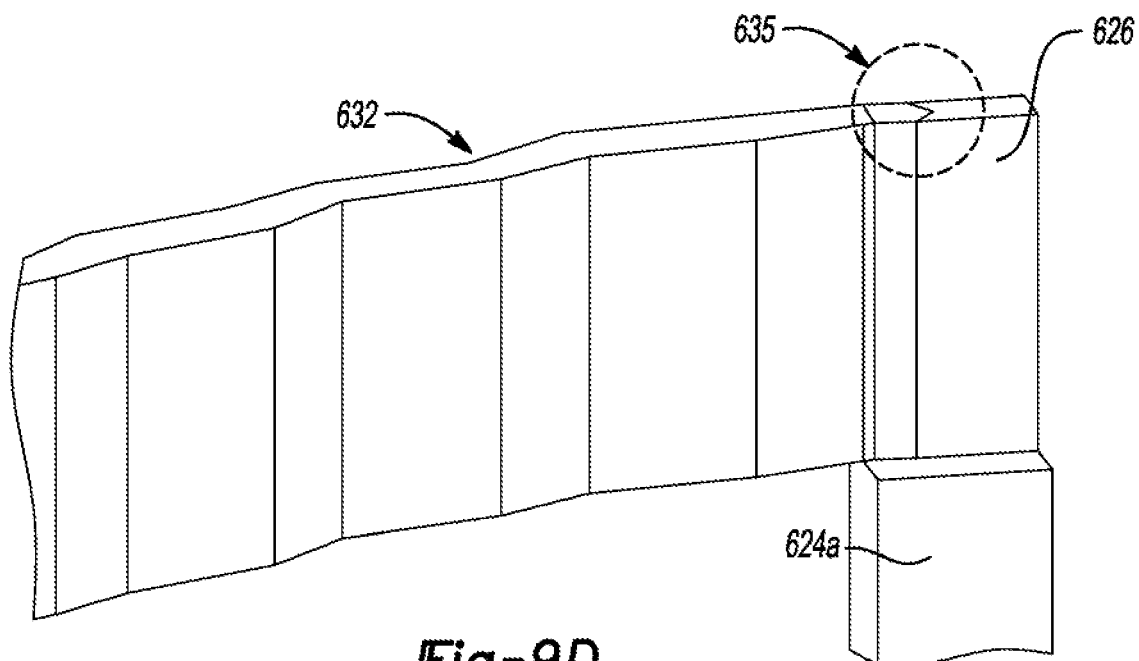
Fig-9D

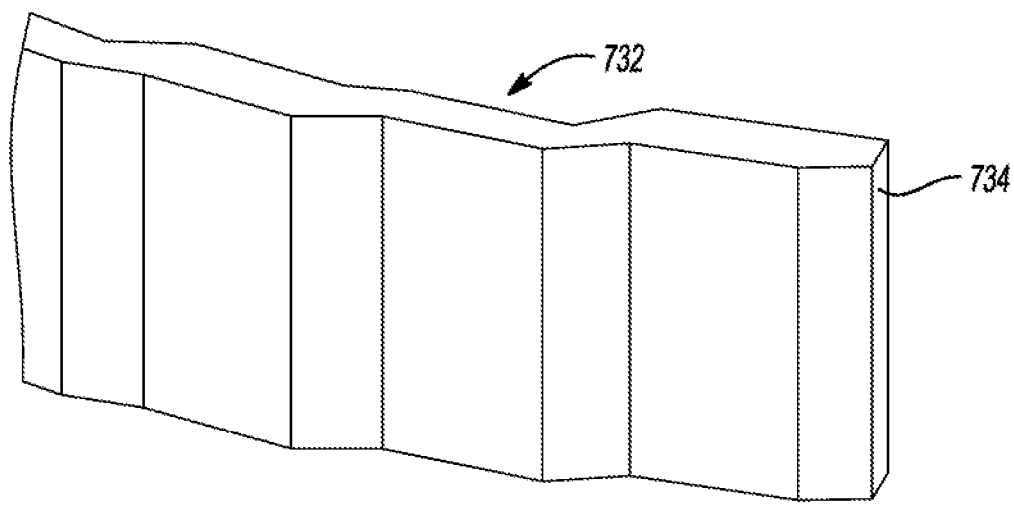
Fig-9E
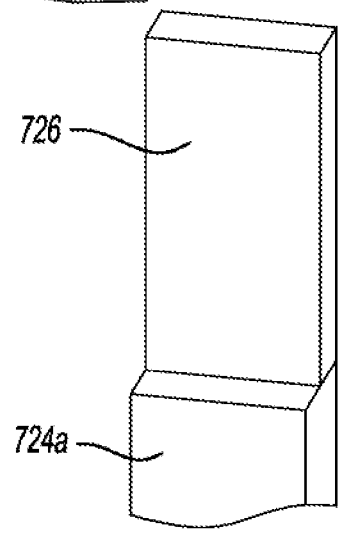
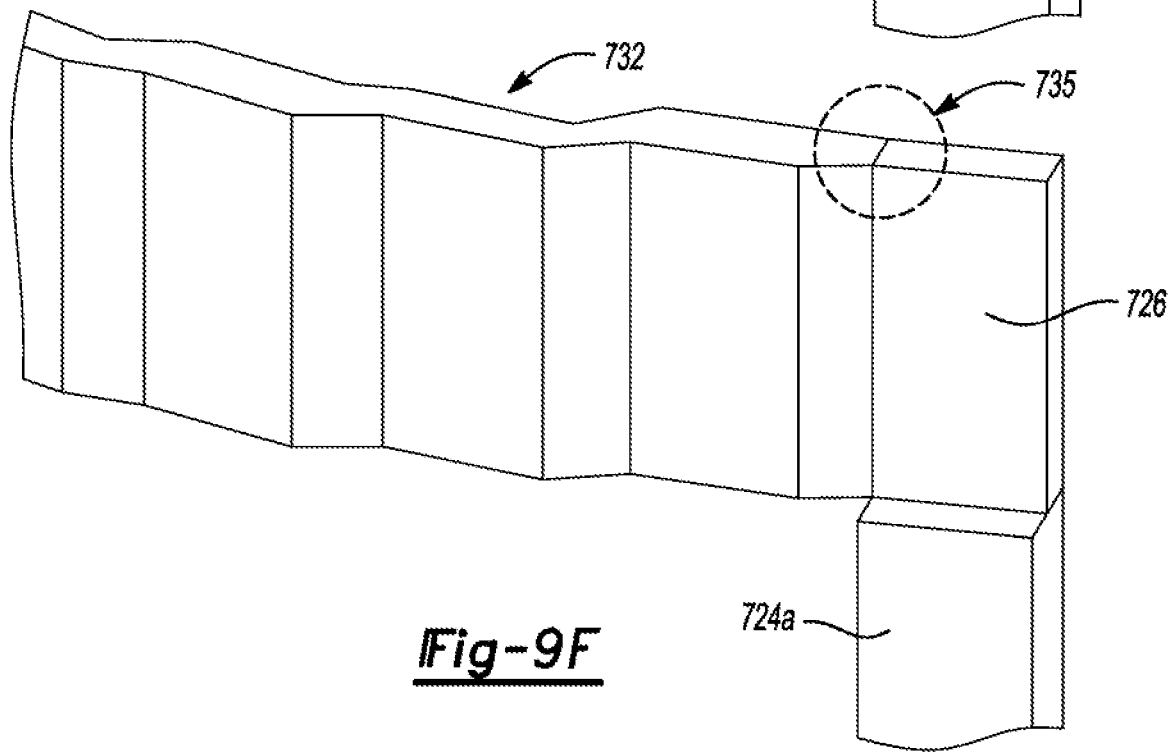
Fig-9F

STATOR FOR ELECTRIC MACHINE WITH MULTI-PART CONDUCTOR ASSEMBLY

TECHNICAL FIELD

This disclosure relates to the field of electric machines. More particularly, it pertains to a stator having a winding that comprises two or more separately fabricated sub-assemblies.

BACKGROUND

Electric machines (motors, generators, etc.) are comprised of several fundamental components that are common to many different types of machines: one or more current carrying components (the conductors or winding); a magnetic path component (the core); and a magnetic field source (one or more coils or magnets). In typical motors, including those currently employed in most electric vehicles, the stator includes windings comprising a plurality of straight portions extending axially through the core (usually passing through slots defined by the core), and a plurality of portions outside of and at each axial end of the core, generally referred to as end-turns. The end-turns electrically connect the axially oriented conductors inside slots defined by the core thereby completing the electrical circuit and creating the desired/required number of electric phases. Although necessary for the correct functioning of the machine, the end-turn region contributes to electrical losses, weight, cost, and volume but not to torque. It is therefore desirable to reduce the length and electrical resistance of the end-turns.

It is conventionally known to manufacture the stator of an electric machine by inserting U-shaped "hairpin conductors" into axially-extending slots formed in the stator from a first axial end of the stator and subsequently inter-connecting the ends of the hairpins projecting from the opposite second axial end of the stator as necessary to achieve the desired circuit path. Each hairpin conductor is conventionally fabricated by bending a copper rod or bar with rectangular cross section. As a result, the shape and area of the conductor cross section remains the same throughout the machine. The end-turns must cross axially over one another at both ends of the stator, and this adds to the overall length of the windings. The end-turns may therefore comprise a significant portion of the total winding length that in short stack machines (defined as machines where the radius is much larger that the axial length) can reach 50% of the total copper content.

Configurations have been suggested that allow electrical machine components to be produced by additive manufacturing, also commonly known as three-dimensional (3D) printing.

SUMMARY

An electric machine includes a core defining a plurality of slots extending parallel to a longitudinal axis of the core, and a first winding assembly comprising a plurality of conductors each disposed in a different one of the slots. Ends of the conductors define terminals projecting axially beyond an end surface of the core. The electric machine also includes a second winding assembly comprising a plurality of bridges. Each bridge includes an arcuate center section extending circumferentially over the end surface at a first axial level relative thereto, first and second necks contiguous with respective first and second ends of the center section and extending therefrom axially away from the end surface, and first and second welding blocks contiguous with the respective necks and welded to the respective terminals of a pair of the conductors at a second axial level farther from the end surface than the first axial level.

A stator for an electric machine includes a winding assembly comprising a plurality of bridges each including an arcuate center section extending circumferentially over an end surface of a core at a first axial level relative thereto, first and second necks contiguous with respective first and second ends of the center section and extending therefrom axially away from the end surface, and first and second blocks contiguous with the respective necks and connected to the respective terminals of a pair of conductors at a second axial level farther from the end surface than the first axial level. The bridges are arranged in mutually radially-nested relationship to each other without overlapping one another.

A stator for an electric machine includes a core defining a plurality of slots extending parallel to a longitudinal axis of the core, and a plurality of U-shaped hairpins each including a first and a second conductor disposed in a respective one of the plurality of slots. First ends of the conductors define terminals projecting axially beyond a first end surface of the core, and second ends of the conductors adjacent a second axial end of the core being interconnected by end-turns with the conductors of others of the plurality of hairpins. The stator further includes a plurality of bridges, each including an arcuate center section extending circumferentially over the first end surface at a first axial level relative thereto, first and second necks contiguous with respective first and second ends of the center section and extending therefrom axially away from the first end surface, and first and second welding blocks contiguous with the respective necks and welded to the respective terminals of a pair of the conductors at a second axial level farther from the end surface than the first axial level.

BRIEF DESCRIPTION OF THE DRAWINGS

FIG. 6 is a perspective view of a representative bridge of the second winding assembly of FIGS. 1 and 5.

FIG. 7 is a perspective view of the core and first winding assembly of FIG. 1 after a first assembly step.

FIG. 8 is a perspective view of the core, first winding assembly, and second assembly of FIG. 1 after a second assembly step.

FIG. 9A is a perspective view of terminal portions of a bridge and mating conductor prior to being connected with one another.

FIG. 9B is a perspective view of the terminal portions of FIG. 9A after being connected with one another.

FIG. 9C is a perspective view of terminal portions of a bridge and mating conductor prior to being connected with one another.

FIG. 9D is a perspective view of the terminal portions of FIG. 9C after being connected with one another.

FIG. 9E is a perspective view of terminal portions of a bridge and mating conductor prior to being connected with one another.

FIG. 9F is a perspective view of the terminal portions of FIG. 9E after being connected with one another.

DETAILED DESCRIPTION

The disclosed embodiments are merely examples and other embodiments can take various and alternative forms. The figures are not necessarily to scale, Some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
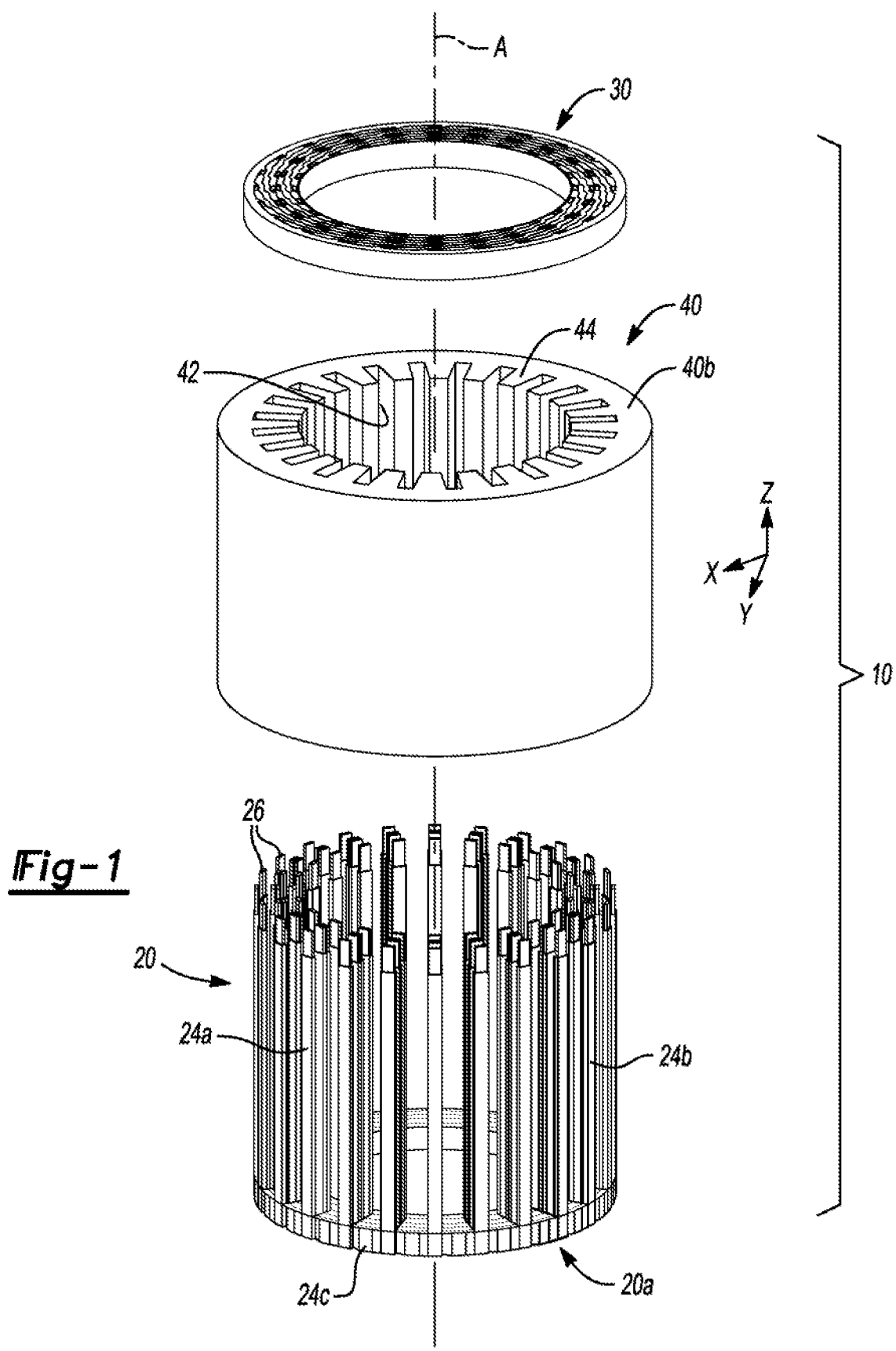
FIG. 1 is a perspective exploded view of portions of major components of a stator of an electric machine.

As seen in the exploded view of FIG. 1, a stator 10 comprises a first winding assembly (FWA) 20, a second winding assembly (SWA) 30, and a core 40. Longitudinal or central axis A indicates the axis of radial symmetry of stator 10 and is also the axis-of-rotation of a generally cylindrical rotor (not shown) that, in an assembled electric machine, is supported within the stator for rotation relative thereto Stator core 40 is generally conventional in configuration and defines a plurality of axially extending slots 42 separated by teeth 44. Core 40 is composed of a ferrous material such as iron or steel and may be fabricated as a unitary component or as a stack of thin layers.

FWA 20 comprises a plurality of U-conductors 24 (which may alternatively be referred to as "hairpins" by persons of skill in the art) each of which comprises two parallel uprights 24a, 24b and an end-turn 24c extending between, connecting, and formed integrally with the uprights. U-conductors 24 are arranged such that radially-adjacent pairs of end-turns 24c are in a radially-nested relationship with one another to form an annular disk or ring 20a laying in the x-y plane indicated in FIG. 1 and uprights 24a, 24b extend parallel to central axis A and to the z-axis. The free ends of uprights 24a, 24b distal from their respective end-turns 24c comprise terminals 26 as further described below.

Figure 2:
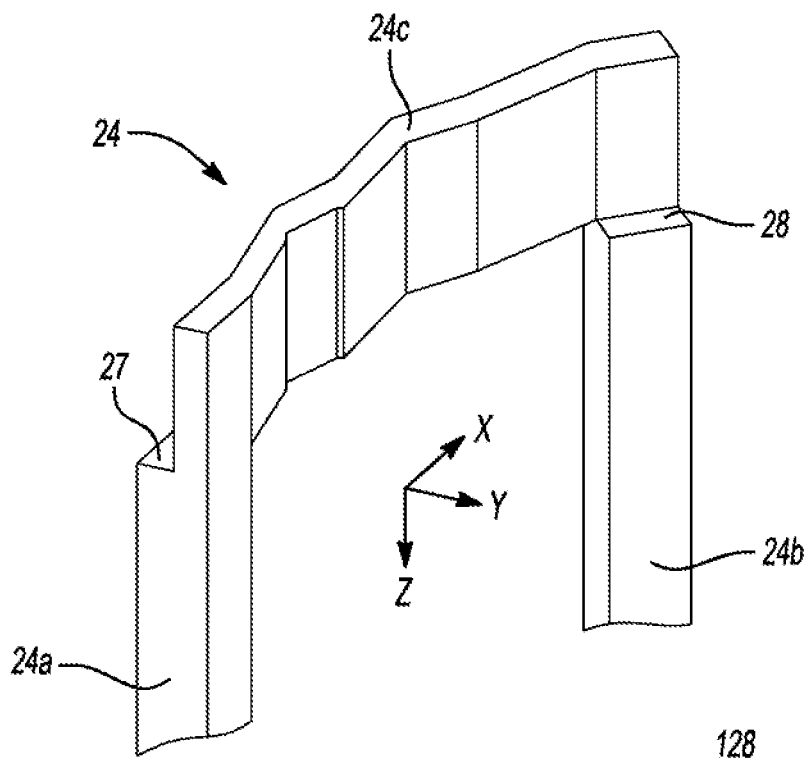
FIG. 2 is a partial perspective view showing a representative U-conductor of the first winding assembly shown in FIG. 1.

To enable the radially-nested relationship of U-conductors 24, end-turns 24c and the portions of uprights 24a, 24b immediately adjacent thereto may be configured as shown in FIG. 2. A first end of end-turn 24a is connected to a radially inner portion of first upright 24a such that the junction between the end-turn and the first upright is configured to define a radially outward-facing ledge 27, and a second end of the end-turn is connected to a radially outer portion of the second upright 24b such that the junction between the end-turn and the second upright is configured to define a radially inward-facing ledge 28. Upright 24a is relatively more radially inward in comparison to upright 24b. Consequently end-turn 24c steps radially outward as it extends clockwise, as viewed in FIG. 2, about the central axis A of SWA 30.

Figure 3:
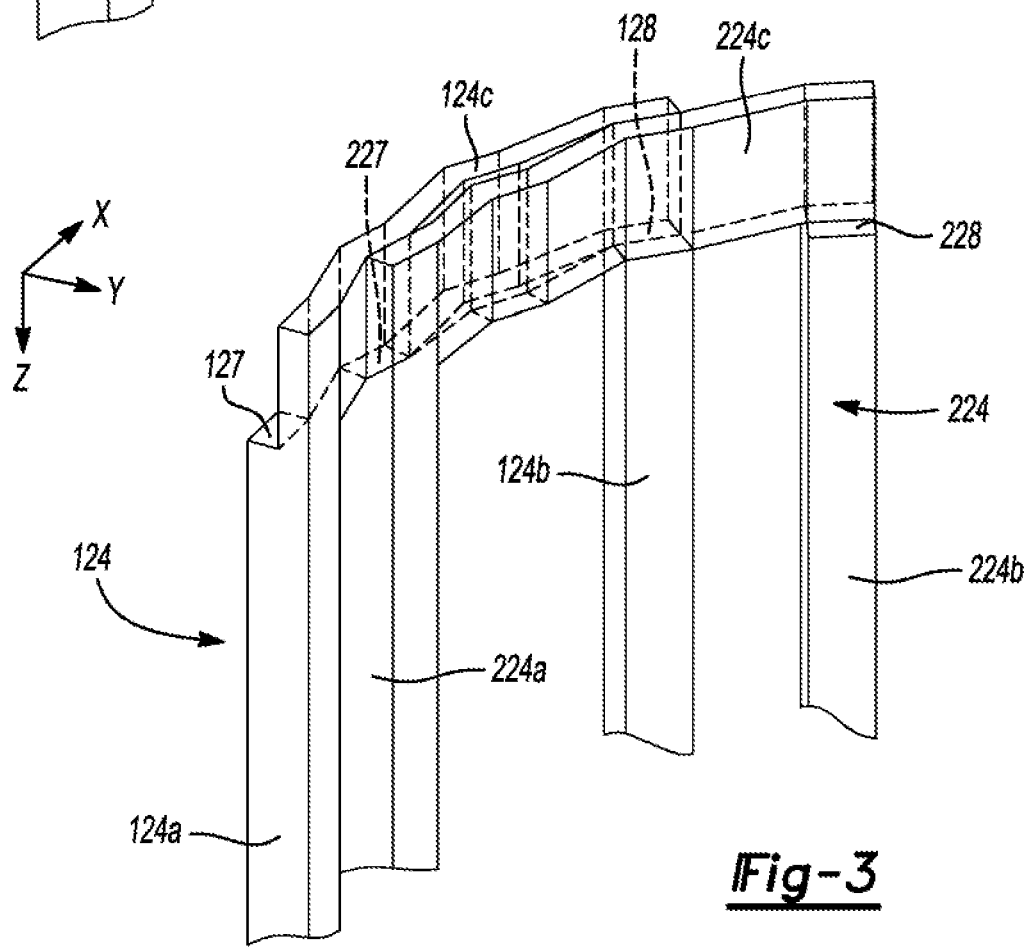
FIG. 3 is a partial perspective view of two radially adjacent conductors shown in FIG. 2, in isolation from the core and other conductors.

The nested relationship between radially-adjacent U-conductors is best seen in FIG. 3, in which two representative U-conductors 124, 224 are shown isolated from the rest of conductors making up FWA 20. The two representative U-conductors shown may be any pair of radially-adjacent U-conductors which compose FWA 20. As shown, the following relationships exist: 1) The end-turn of a radially outer U-conductor 124 lies in and passes over the outward-facing ledge 227 of a radially inner conductor 224; and 2) The end-turn of the radially inner conductor 224 passes over and lies in the inward-facing ledge 128 of the radially outer conductor 124. As this closely-nested relationship between each pair of radially-adjacent U-conductors 124, 224 is repeated around the circumference and across the radius of ring 20a, the requirement for end-turns of the U-conductor to cross axially over one another is avoided.

As compared with a conventionally-known stator in which the end-turns of conductors cross over (overlap) one another at the axial ends of the core, the disclosed radially-nested configuration allows for conductors to be shorter in total length and therefore use less material and produce less electrical resistance. Further, the disclosed stator (and hence the electrical machine overall) may be more axially compact than is known in the prior art.

Figure 4:
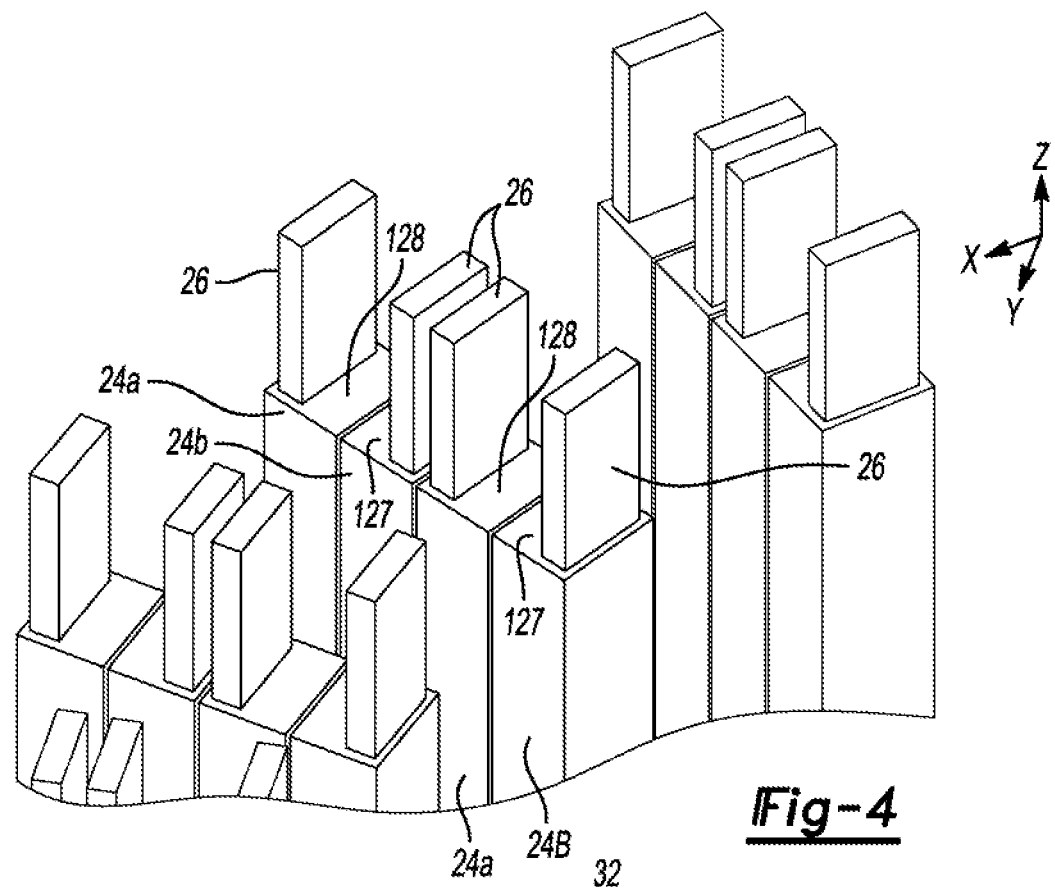
FIG. 4 is a partial perspective view of the first winding assembly of FIG. 1.

As best seen if FIG. 4, the distal ends of uprights immediately adjacent to terminals 26 are configured to form outward-facing ledges 127 and inward-facing ledges 128 similar to the ledges 27, 28 shown in FIGS. 3 and 4. Ledges 127, 128 allow elements of SWA 30 to mate with terminals 26 in an axially-nested fashion, as described further below.

U-conductors 24 are formed of material having a high electrical conductivity (such as copper) and are covered by a non-conductive coating so as to be electrically insulated from one another (and from core 40 when assembled therewith). Because the insulating coating is very thin relative to the size of the conductors it is not shown in the figures or identified by a reference number.

FWA 20 may advantageously be formed using an additive manufacturing process (also known as three-dimensional or 3D printing) wherein stratified layers of material are deposited in sequence on top of one another. Such a process may allow U-conductors 24 to be printed simultaneously with one another and in the nested relationship shown. The 3D printing process further allows the fabrication of end-turns that vary in cross-sectional shape and/or are over their respective lengths. A thin insulating layer (not shown) surrounding the U-conductors 24 may also be formed simultaneously by such a process.

Figure 5:
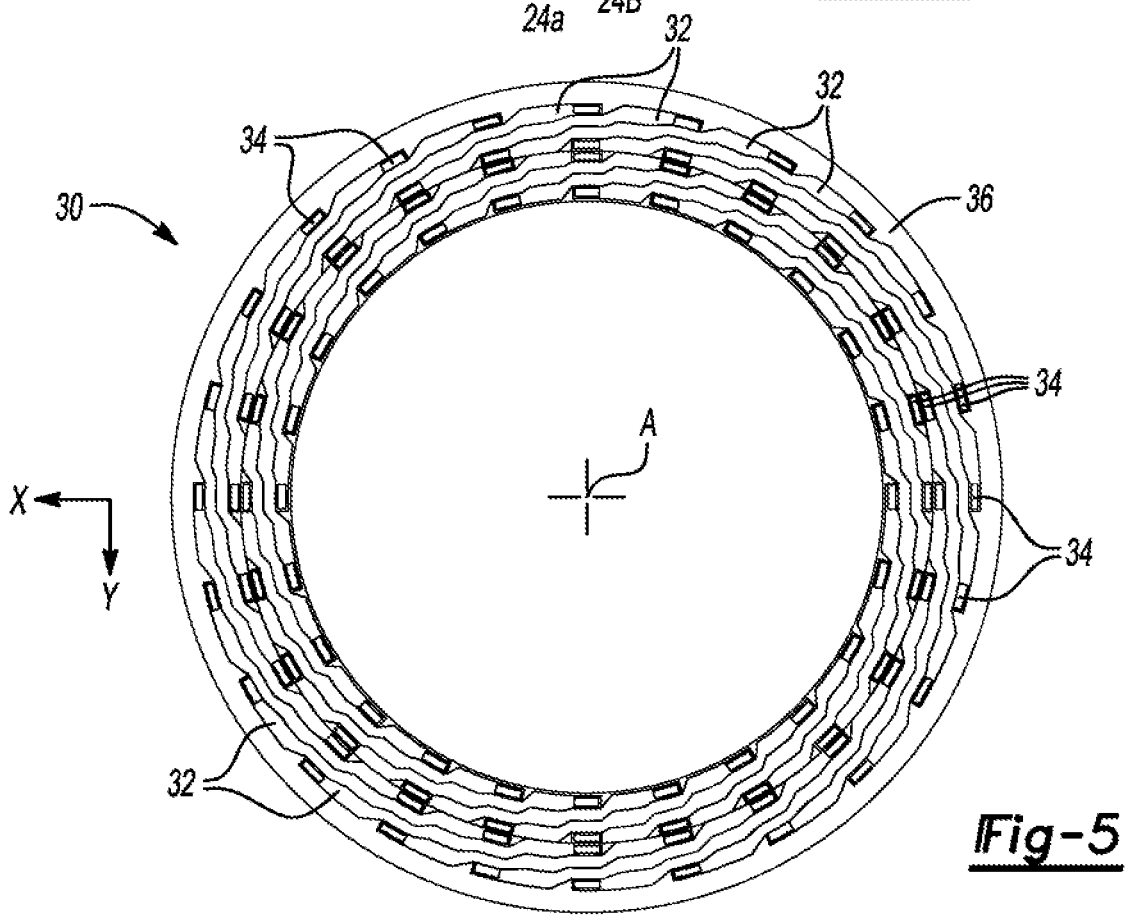
FIG. 5 is a plan view of the second winding assembly of FIG. 1.

SWA 30 (see FIG. 5) comprises a plurality of electrically conductive bridges 32 configured substantially similar to end-turns 24c and arranged in a mutually nested relationship substantially similar to that of ring 20a. When in the nested arrangement, bridges 32 are electrically insulated from one another, for example by thin dielectric coatings, as described above in relation to U-conductors 24.

A representative one of the bridges 32 is shown in FIG. 6 to have opposite ends defining respective second terminals 32a, 32b that are configured for mating electrical connection to respective first terminals 26. In the embodiment of FIG. 6, second terminals 32a, 32b define generally rectangular openings 34 adapted to receive first terminals 26 therein.

SWA 30 may further comprise a casing 36 partially enclosing the ring formed by nested bridges 32 and holding the bridges together in a unitary, rigid disk. In the embodiment shown, casing 36 encloses the ring of nested bridges 32 on the circumferentially outer surface and on the radially inner surface thereof. Casing 36 is formed of an electrically non-conductive material such as epoxy and may be formed by an over-molding process after bridges 32 have been arranged in their ring-shaped, mutually nested relationship. Casing 36 may fill any gaps or spaces that may exist between adjacent bridges 32.

As also shown in FIG. 6, bridges 32 may vary in width along their circumferential lengths/spans. Specifically, the portions of the bridge that (when SWA 30 is assembled with FWA 20 and core 40, as described below) pass over (directly axially above) the teeth 44 separating slots 42 are greater in radial width than the adjacent portions of the bridge passing over the slots. This length-wise variation of the radial widths of the bridges is also enabled by a 3D printing process. This width variation may also be present in end-turns 24c.

Referring now to FIG. 7, in a first stator assembly step, FWA 20 is inserted axially into core 40 such that ring 20a formed by end-turns 24c is closely adjacent to or contacting a first end surface of the core (the far end of the core, not visible in FIG. 7) and uprights 24a, 24b are disposed in respective slots 42. First terminals 26 at the distal ends of the uprights project axially beyond a second end surface 40b of the core.

The uprights 24a, 24b of each U-conductor are disposed in respective slots separated by one or more intervening slots which are spanned by end-turns 24c. The number of intervening slots spanned by an end-turn 24c is dictated by several design features of the electrical machine (the number of electrical phases and the number of slots-per-pole, for example). In the depicted embodiment, a three-phase, three slots-per-pole stator is shown, wherein each end-turn 24c spans two intervening slots. The disclosed design concepts may be applied to electric machines having configurations different from this embodiment.

In a second assembly step, SWA 30 is positioned in axial alignment with the combined FWA 20 and core 30 and moved relative to those components along axis A so that first terminals 26a, 26b of each U-connector are brought into engagement with their respective second terminals 32a, 32b (FIG. 8). Comparing FIGS. 5 and 7 with one another, it is apparent that this engagement is enabled by the number and locations of first terminals 26 corresponding to the number and locations of openings 34 defined by each of bridges 32. At the conclusion of the second assembly step, bridges 32 are closely adjacent to or contacting (but, due to their dielectric coatings, electrically insulated from) core 40.

In an alternative embodiment of a second assembly step, the bridges 32 may be placed in engagement with their respective first terminal 26a, 26b individually or in a plurality of groups, rather than first being formed into a unitary SWA as described above. In this care, each group may comprise any number of bridges less than the total number included in SWA 30. In this embodiment, the casing may be dispensed with completely or the casing may be over-molded onto the ring-shaped array of bridges after it is assembled to the FWA. In another alternative, groups of any number of bridges 32 may be enclosed by insulating casings to form multiple sub-units that are then assembled to the FWA.

First terminals 26a, 26b and second terminals 32a, 32b may take a variety of complementary shapes designed to minimize electrical resistance to current passing through the junction therebetween. In a first exemplary embodiment shown in FIGS. 9A-B, a first terminal 26 comprises a generally rectangular tenon and a second terminal 32a defines a mortise 34 configured to matingly receive the tenon to thereby form a mortise-and-tenon joint. In a second exemplary embodiment shown in FIGS. 9C-D, a first terminal 626 defines a groove 626a and a second terminal 632a comprises a V-shaped tongue 634 which fits into the groove to thereby form a tongue-and-groove joint 635. In a third exemplary embodiment shown in FIGS. 9E-F, a first terminal comprises a generally rectangular peg 726 and a second terminal 732a comprises a butt end 734. Butt end 734 presses against a generally flat surface of peg 726 to thereby form a butt-type joint 735.

The second assembly step may further include heating of the junctions between the mating first and second terminals, for example by laser welding, to improve the quality, durability, and reliability of the electrical connection.

As will be apparent to persons of skill in the art, additional components and/or connections (terminals, neutral connections, jumpers, etc.) needed to complete the electrical circuits formed by the windings disclosed herein may be incorporated at either axial end of the core.

FIGS. 10-17 show components of a second embodiment of a stator having three-phases and six slots-per-pole (two slots-per-pole for each phase). In this design the number of end-turns and bridges that must span the intervening slots is twice that of the three slots-per-pole design in the first embodiment described above. To achieve this, the end-turns of the U-conductors at a first end of the core and the corresponding bridges at the second end of the core are arranged in two layers: an inner layer immediately adjacent to the end surfaces of the core (substantially similar to the previously described end-turns and bridges) and an outer layer spanning over and passing axially above the inner layer.

Figure 10:
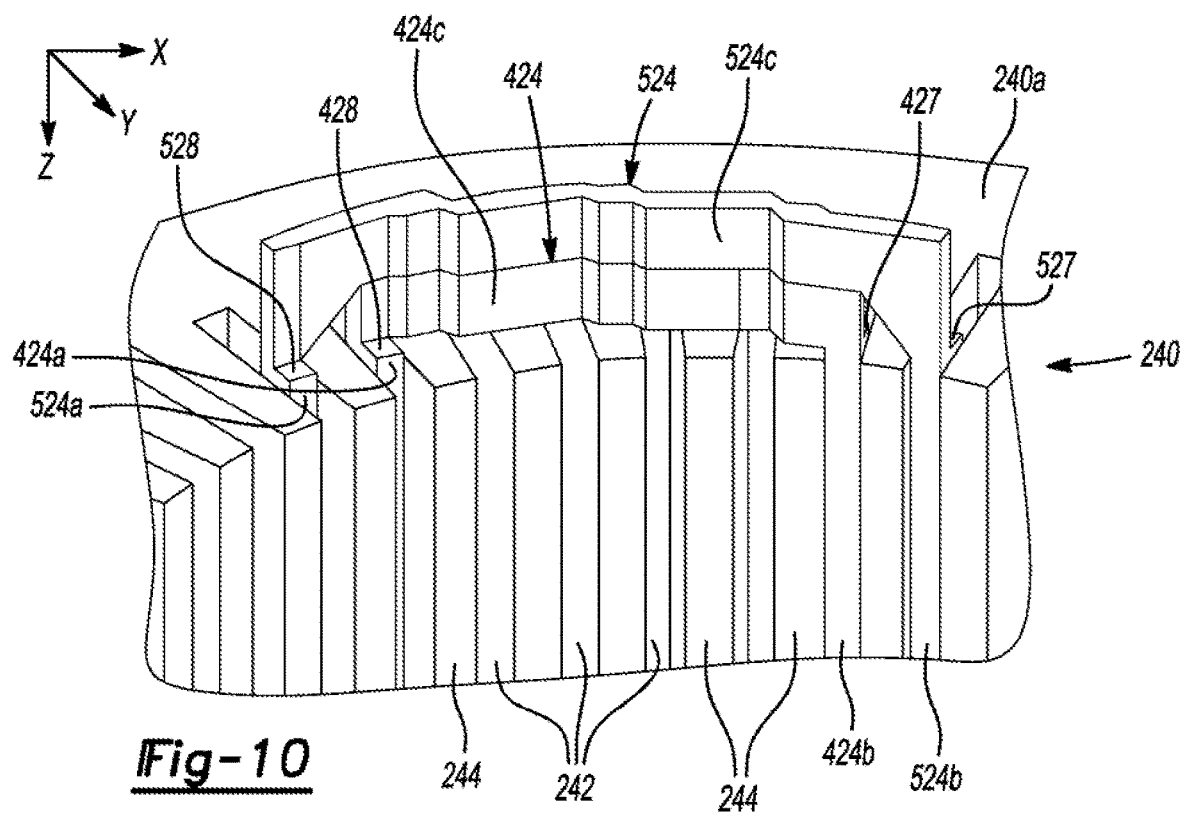
FIG. 10 is a perspective view of a representative pair of inner and outer U-conductors of a first winding assembly.
Figure 11:
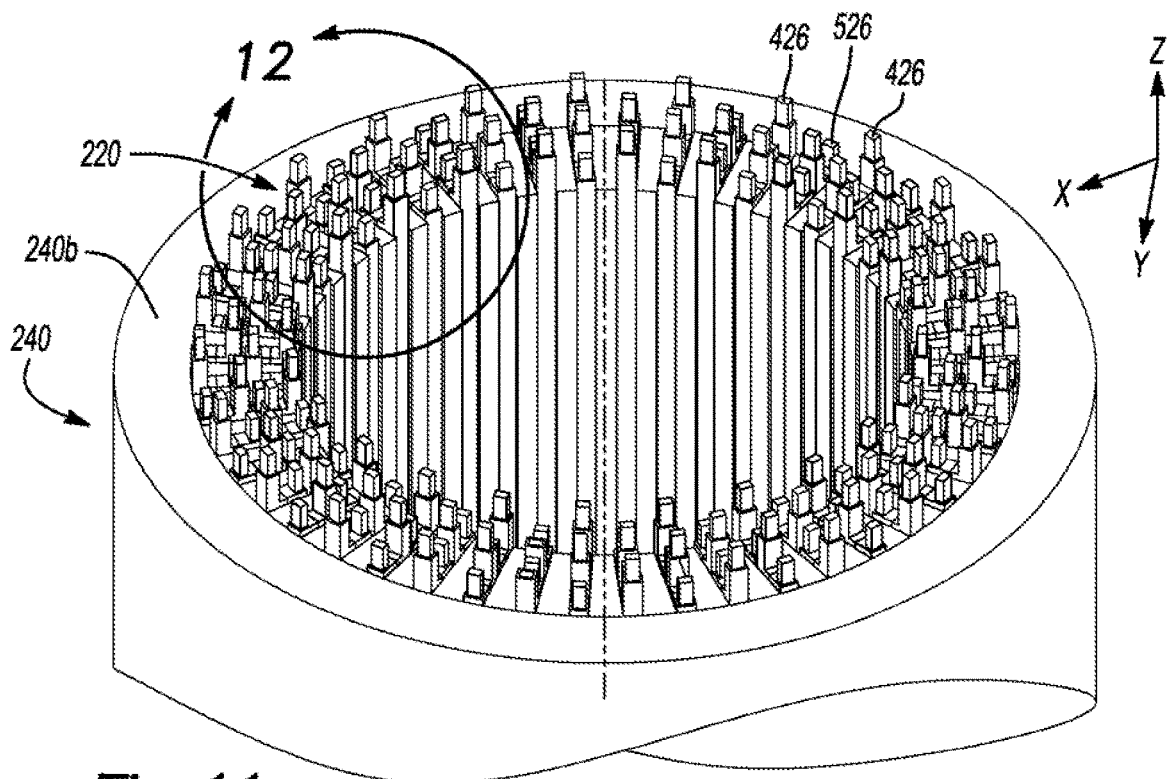
FIG. 11 is a perspective view of the first winding assembly of FIG. 10 inserted in a core.

FIG. 10 shows a stator core 240 along with portions of an inner U-conductor 424 and an outer U-conductor 524 (both of which belong to a common electrical phase of the electrical machine) that are components of a dual-layer first winding assembly (DL-FWA) 220. The depicted inner/outer pair of U-conductors 424, 524 depicted is representative of any such pair comprising DL-FWA 220, and the rest of the component U-conductors are not shown in FIG. 10 for clarity.

Inner U-conductor 424 comprises uprights 424a, 424b (shown disposed in respective slot 242 defined by core 240) and inner end-turn 424c connecting the uprights. Inner U-conductors 424 are substantially identical to U-conductors 24 making up FWA 20 of the first disclosed embodiment, except that end-turns 424c span four intervening slots 242 between the uprights 424a, 424b.

Outer U-conductor 524 comprises uprights 524a, 524b connected by outer end-turn 524c. As depicted in FIG. 10, uprights 424b and 524b are positioned more radially inboard than uprights 424a, 524a and therefore both inner and outer end-turns 424c, 524c step radially outward as then extend in a generally counterclockwise circumferential direction over end surface 240a. Outer end-turn 524c spans six intervening slots (two of which are occupied by inner uprights 424a-b) and extends immediately axially above and parallel with inner end-turn 424c. Outer uprights 524a-b are disposed in slots immediately adjacent to and circumferentially outboard (relative to inner end-turn 424c) of the slots containing inboard uprights 424a-b. The junctions between outer uprights 524a-b and the respective opposite ends of outer end-turn 524c form inward-facing and outward-facing ledges 528, 527 disposed even with (located at the same axial position as) the corresponding inner end-turn ledges 428, 427. This configuration allows a mutual nesting of radially-adjacent end-turns, substantially identical to that described in relation to the single-layer end-turns of the previous embodiment. In this dual-layer embodiment, the end-turns of the inner layer nest radially against one another, and the end-turns of the outer layer nest radially against one another directly above those of the inner layer. DL-FWA 220 may advantageously be fabricated by a 3D printing process, as described above.

Figure 12:
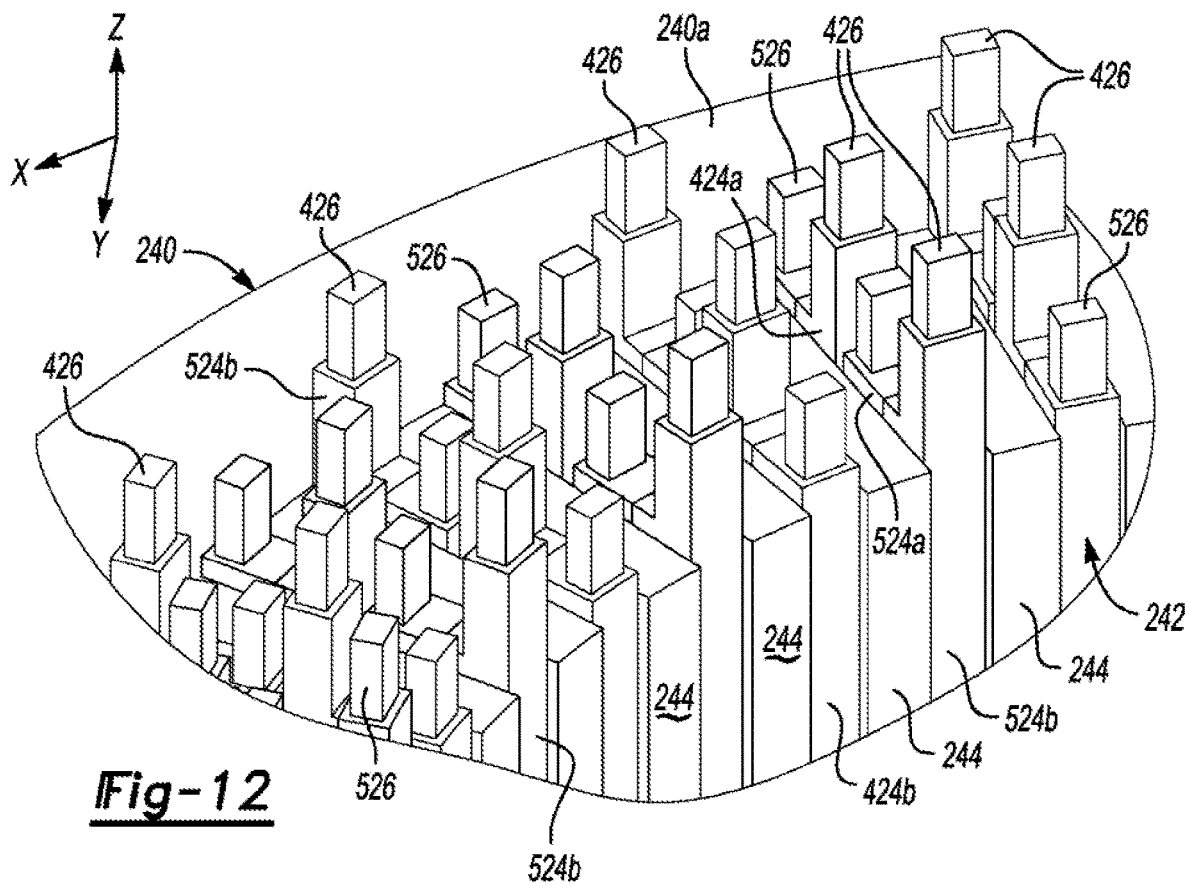
FIG. 12 is an enlarged view of the first winding assembly and core of FIG. 11.

FIGS. 1I and 12 show DL-FWA 220 fully inserted into core 240 after a first assembly step. It should be noted that the end surface 240b visible in FIG. 10 is the axially opposite end from end surface 240a shown in FIG. 11. The distal ends of outer U-conductor uprights 524a-b (distal from end-turns 524c) comprise terminals 526 that project a relatively short distance beyond (above, in the depicted orientation) core end surface 240b. The distal ends of inner uprights 424a, 424b (distal from end-turns 424c) comprise terminals 426 that project a relatively longer (compared with the projection distance of terminals 526) distance beyond core end surface 240b. In this six slots-per-pole embodiment, each slot 242 contains two inner U-conductor uprights 424a, 424b terminating in terminals 426, and further contains two outer U-conductor uprights 524a, 524b terminating in terminals 526.

A dual-layer second winding assembly (DL-SWA) 430 (FIG. 13) comprises a plurality of electrically conductive inner bridges 432 configured substantially similar to inner end-turns 424c (and to bridges 32 of the single layer FWA previously described) and arranged in a mutually nested relationship substantially similar to that of the ring 20a of the first disclosed embodiment. Inner bridges 432 are electrically insulated from one another when in the mutually nested arrangement, for example by thin dielectric coatings, as described above in relation to U-conductors 24.

Figure 13:
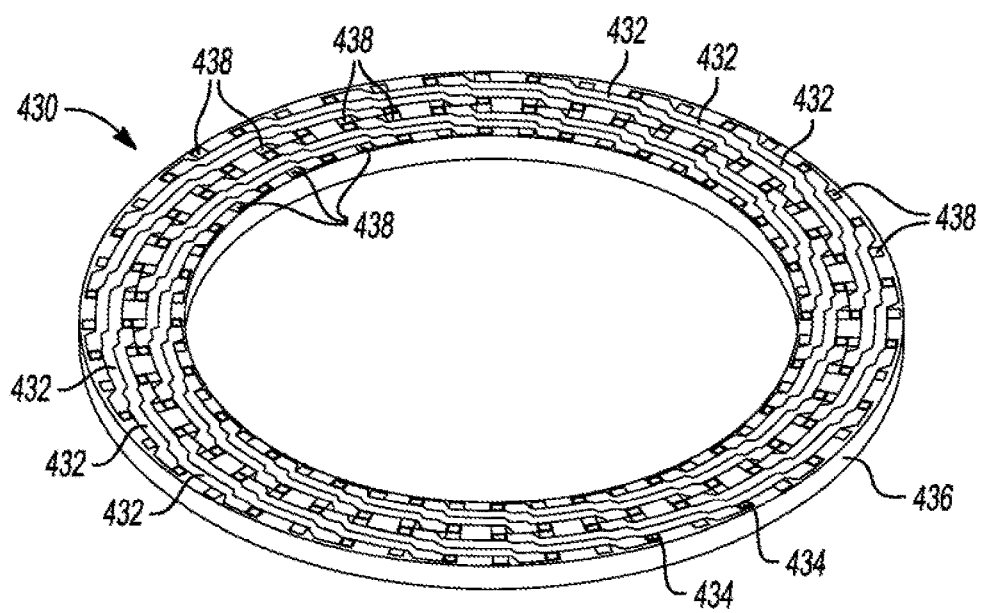
FIG. 13 is a perspective view of a second winding assembly.

Opposite ends of inner bridges 432 comprise respective second terminals 432a, 432b that are configured for mating electrical connection with respective terminals 526 of the outer U-connectors. In the embodiment of FIG. 13, second terminals 432a, 432b define generally rectangular mortises 434 adapted to receive terminals 526 therein, similar to the configuration shown in FIGS. 9A-B.

DL-SWA 430 may further comprise a casing 436 partially enclosing the ring-shaped array of nested inner bridges 432. In the embodiment shown, casing 436 encloses the ring of bridges 432 on the circumferentially outer surface and on the radially inner surface thereof. As in the first embodiment disclosed herein, casing 436 is formed of an electrically non-conductive material such as epoxy and may be formed by an over-molding process after inner bridges 432 have been arranged in their ring-shaped, mutually nested relationship.

A plurality of holes or pass-throughs 438 are defined in casing 436, the pass-throughs being located in radial alignment with mortices 434. Pass-throughs 438 are thus positioned to allow terminals 426 at the distal ends of inner U-conductor uprights 424a, 424b to extend therethrough when, in a second assembly step (see FIG. 14), DL-SWA 430 is placed onto core 240 such that outer conductor first terminals 326 are placed into engagement with respective inner bridge second terminals 432a, 432b.

Figure 15:
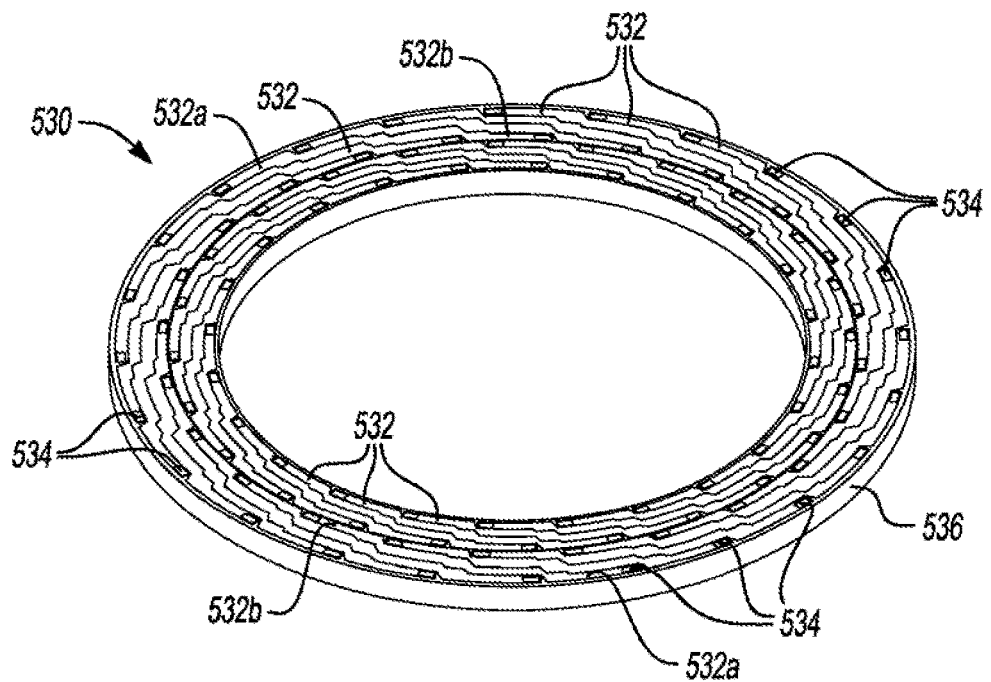
FIG. 15 is a perspective view of a third winding assembly.

A third dual-layer winding assembly (DL-TWA) 530 (FIG. 15) comprises a plurality of electrically conductive outer bridges 532 configured substantially similar to outer end-turns 524c (and, aside from spanning a greater number of intervening slots, to inner bridges 432) and arranged in a mutually nested relationship substantially similar to that of DL-SWA 430. Outer bridges 532 are electrically insulated from one another when arrayed as shown in FIG. 15, for example by thin dielectric coatings, as described above.

Opposite ends of outer bridges 532 comprise respective second terminals 532a, 532b configured for mating physical and electrical connection with respective first terminals 426 of the inner U-connectors. In the embodiment of FIG. 15, second terminals 532a, 532b define generally rectangular mortises 534 adapted to receive terminals 426 therein.

DL-TWA 530 may further comprise a casing 536 partially enclosing the ring formed by the nested outer bridges 532. In the embodiment shown, casing 536 encloses the ring of nested bridges 532 on the circumferentially outer surface and on the radially inner surface thereof. Similar to the first embodiment disclosed herein, casing 536 is formed of an electrically non-conductive material such as epoxy and may be formed by an over-molding process after outer bridges 532 have been arranged in their ring-shaped, mutually nested relationship.

Figure 14:
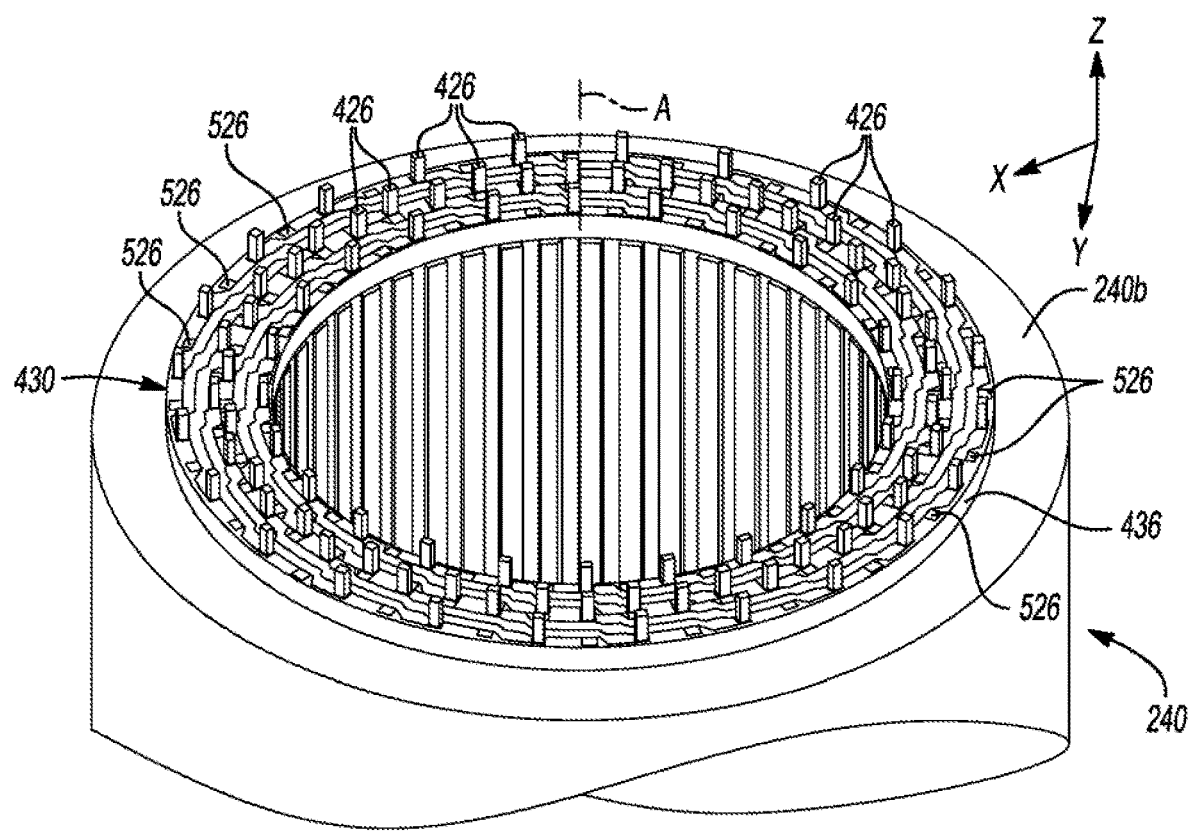
FIG. 14 is a perspective view of the second winding assembly of FIG. 12 assembled with the first winding assembly and core of FIG. 11.
Figure 16:
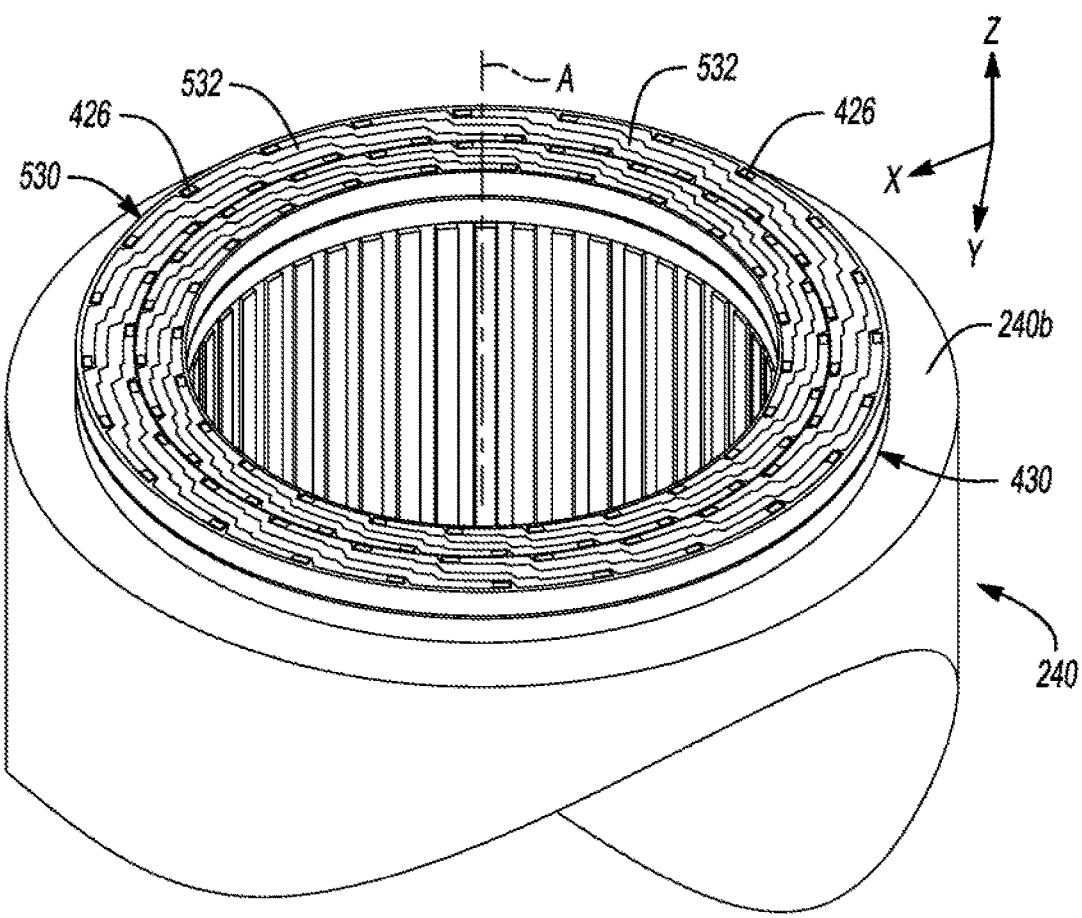
FIG. 16 is a perspective view of the third winding assembly of FIG. 15 assembled with the components of FIG. 14.
Figure 17:
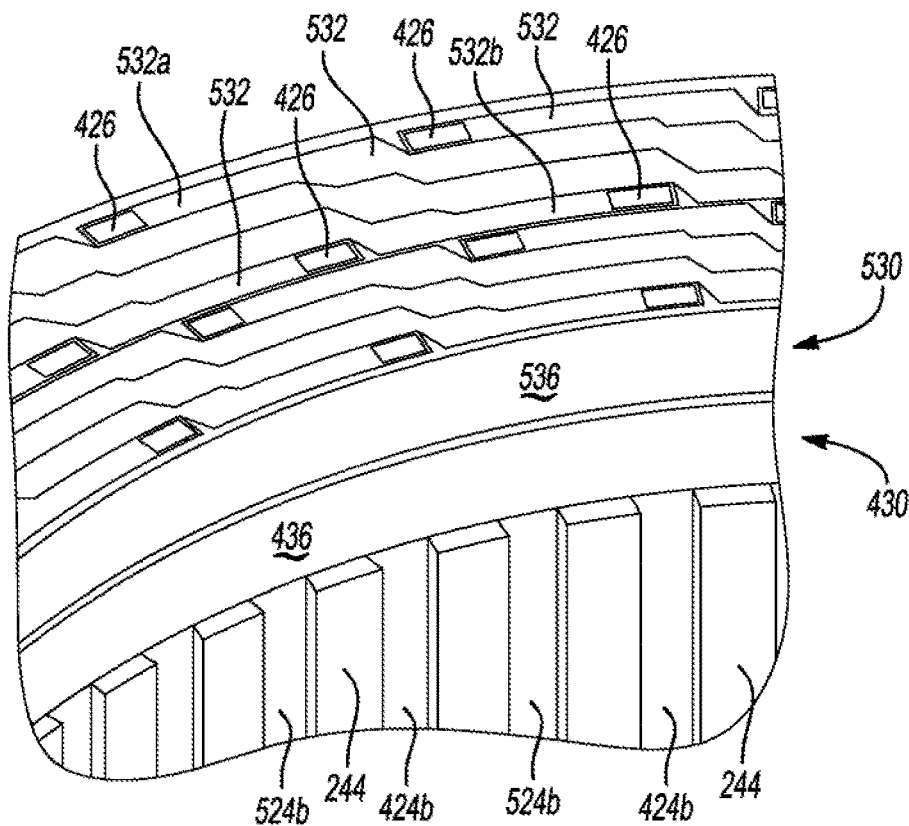
FIG. 17 is a is an enlarged view of a portion of FIG. 16.

In a third assembly step, DL-TWA 530 is placed in axial alignment with the core/DL-FWA/DL-SWA combination of FIG. 14 and moved relative thereto along axis A so that terminals 532a, 532b at opposite ends of outer bridges 532 are placed in engagement with respective inner U-connector terminals 426 (FIG. 16). As best shown in FIG. 17, only the tips of inner U-connector terminals 426 are visible when engaged with their respective bridge terminals 532a, 532b. Inner and outer casings 436, 536 are thus in an axially stacked relationship with one another and the circuits formed by the stator windings are completed.

Figure 18:
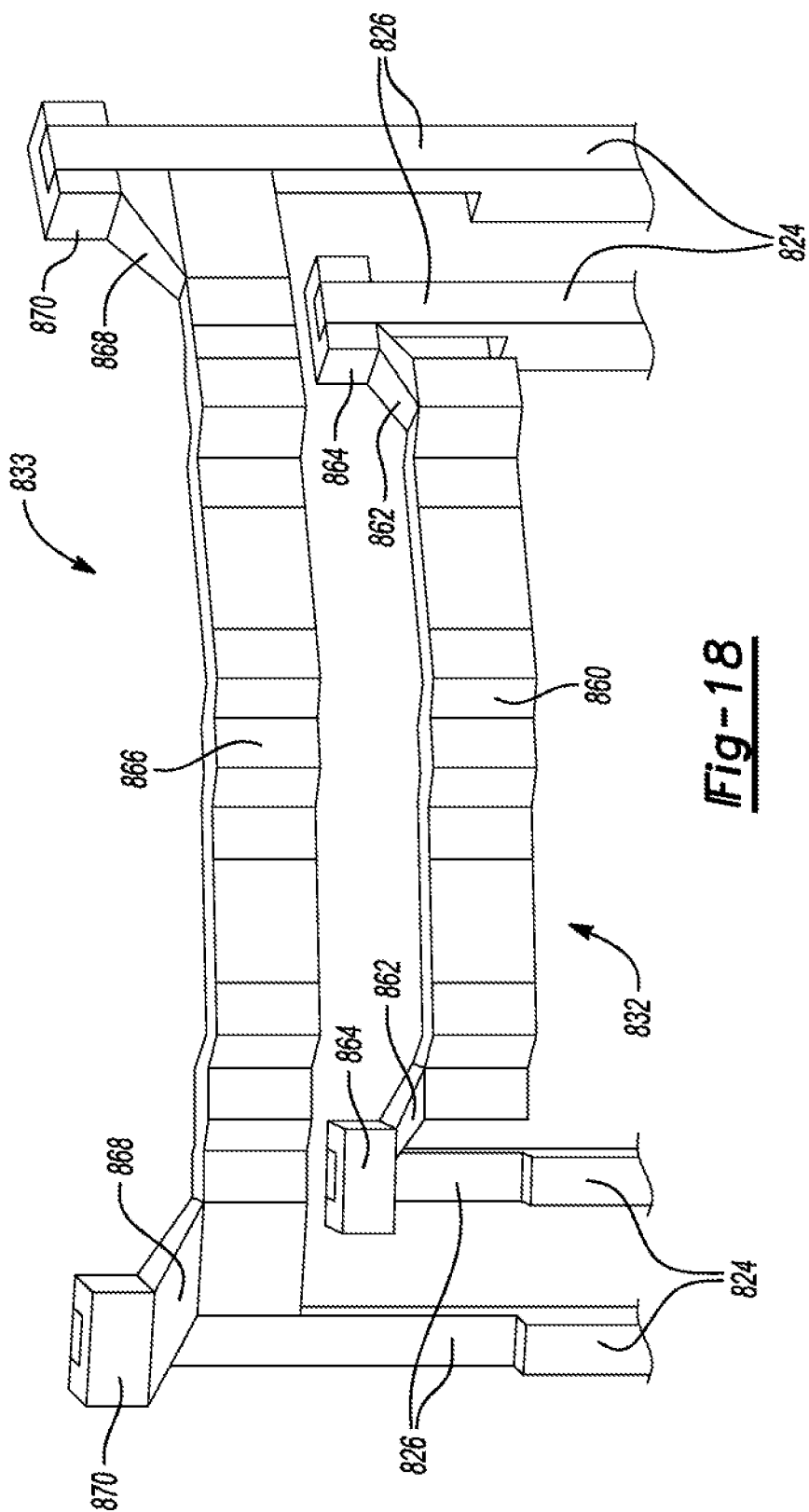
FIG. 18 is a perspective view of terminal portions of a bridge and mating conductor after being connected with one another.
Figure 19:
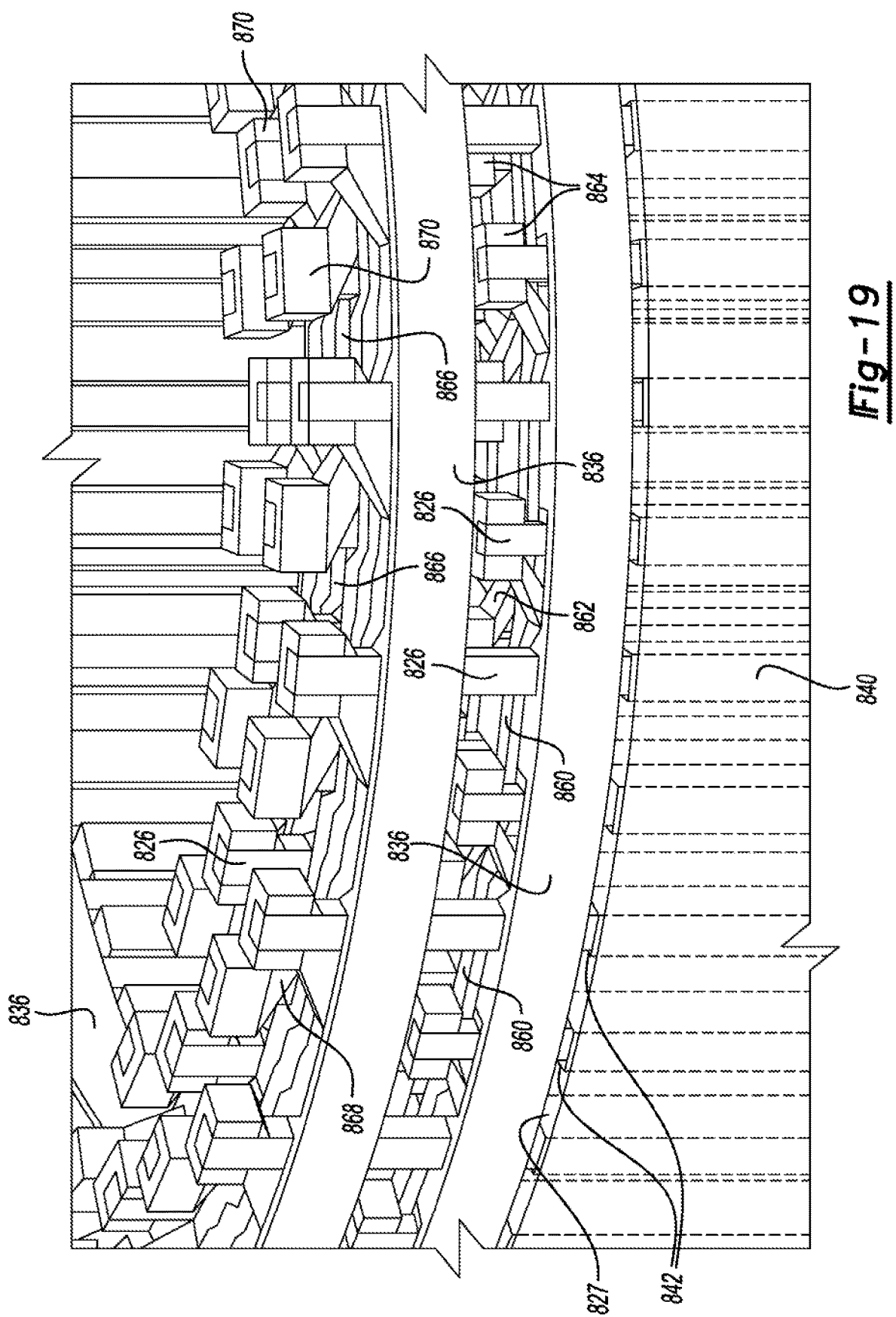
FIG. 19 is a perspective view of a winding assembly.

FIGS. 18 and 19 show a core 840 that defines a plurality of slots 842 extending parallel to a longitudinal axis of the core 840, and a plurality of conductors 824 each disposed in a different one of the slots 842. Ends of the conductors 842 define terminals 826 that project axially beyond an end surface 827 of the core 840. Some are longer than others.

FIGS. 18 and 19 also show a plurality bridges 832, 833. Each of the bridges 832 has an arcuate center section 860 that extends circumferentially over the end surface at a first axial level relative thereto, first and second necks 862 contiguous with respective first and second ends of the center section 860 and extending therefrom axially away from the end surface 827, and first and second welding blocks 864 contiguous with the respective necks 862 and welded to the respective terminals 826 of a pair of the conductors 824 at a second axial level farther from the end surface than the first axial level. Each of the bridges 833, which is axially over the bridges 832, has an arcuate center section 866 that extends circumferentially over the end surface 827 at a third axial level relative to the end surface 827, first and second necks 868 contiguous with respective first and second ends of the center section 866 and extending therefrom axially away from the end surface 827, and first and second welding blocks 870 contiguous with the respective necks 868 and welded to the respective terminals 826 of a pair of the conductors 824 at a fourth axial level farther from the end surface 827 than the third axial level.

The bridges 832 are disposed in a ring, and the bridges 833 are disposed in a ring. Each of the rings has an electrically non-conductive casing 836 enclosing the ring on a circumferentially outer surface thereof and on a radially inner surface thereof.

Figure 20:
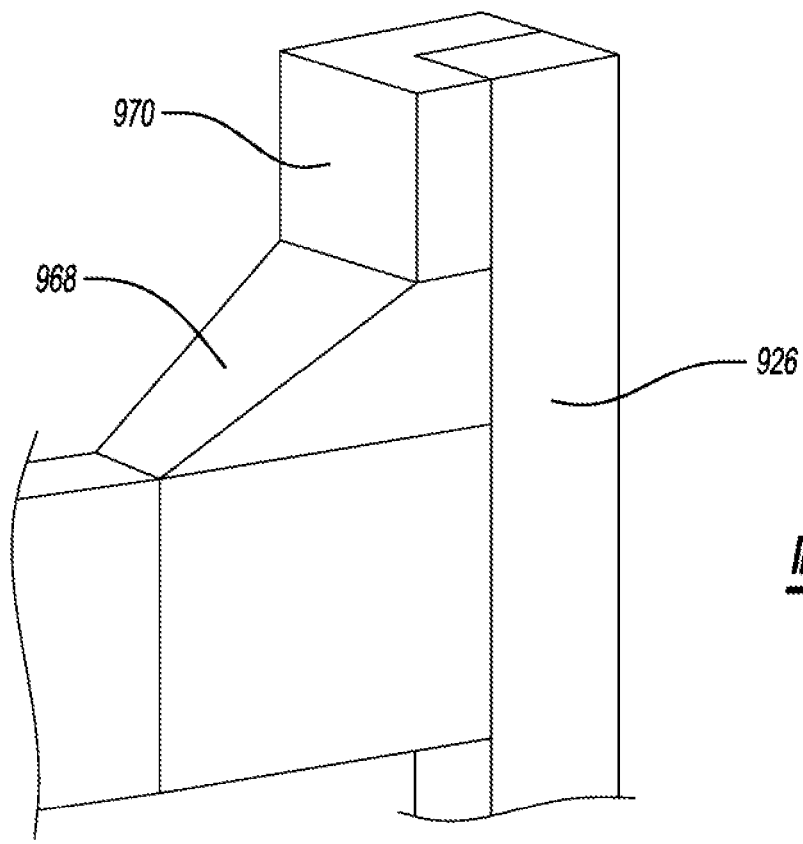
FIG. 20 is a perspective view of a terminal portion of a bridge and mating conductor after being connected with one another.
Figure 21:
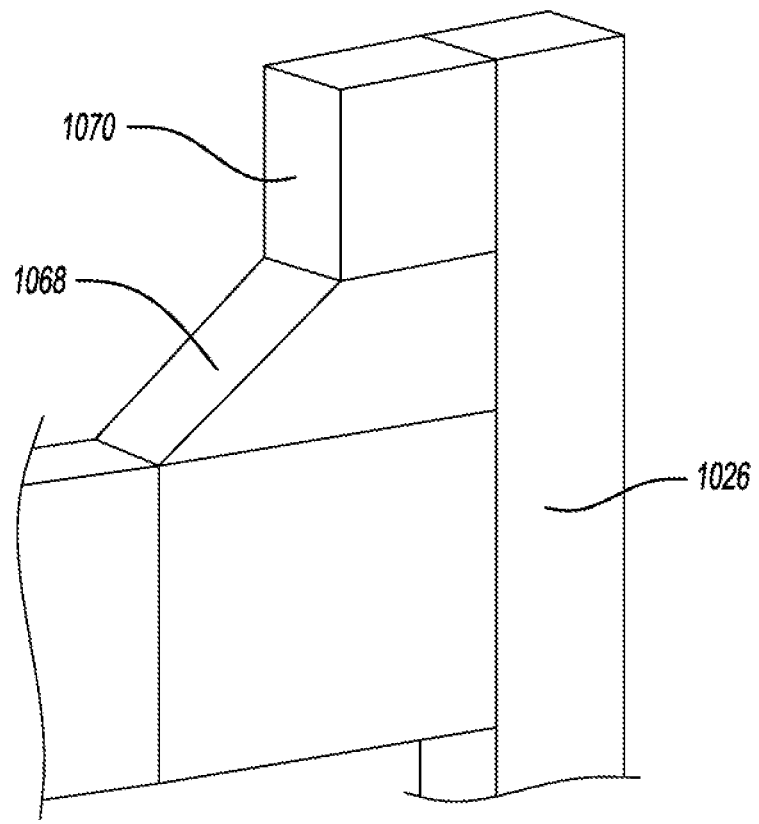
FIG. 21 is a perspective view of a terminal portion of a bridge and mating conductor after being connected with one another.

FIG. 20 shows an alternative welding block configuration. Welding block 970 extends from neck 968 and contacts only two sides of terminal 926. FIG. 21 likewise shows welding block 1070 extending from neck 1068 and contacting one side of terminal 1026. Other arrangements are also contemplated.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An electric machine comprising:
   a core defining a plurality of slots extending parallel to a longitudinal axis of the core;
   a first winding assembly comprising a plurality of conductors each disposed in a different one of the slots, ends of the conductors defining terminals projecting axially beyond an end surface of the core; and
   a second winding assembly comprising a plurality of bridges, each bridge including an arcuate center section extending circumferentially over the end surface at a first axial level relative thereto, first and second necks contiguous with respective first and second ends of the center section and extending therefrom axially away from the end surface, and first and second welding blocks contiguous with the respective necks and welded to the respective terminals of a pair of the conductors at a second axial level farther from the end surface than the first axial level.

2. The electric machine of claim 1, wherein the ends of at least one of the center sections are spaced from their respective terminals at the first axial level.

3. The electric machine of claim 1, wherein the plurality of bridges is disposed in a ring and the second winding assembly further comprises an electrically non-conductive casing enclosing the ring on a circumferentially outer surface thereof and on a radially inner surface thereof.

4. The electric machine of claim 1, wherein the pair of conductors comprises a first conductor disposed at a first radial distance relative to the longitudinal axis and a second conductor disposed at a second radial distance greater than the first radial distance, and radially adjacent bridges are disposed in radially-nested relationship with one another without overlapping one another.

5. The electric machine of claim 1, wherein the terminals have a cross-section defining four lateral surfaces and the welding blocks contact at least two of the four lateral surfaces.

6. The electric machine of claim 1, wherein the conductors of the pair are connected with one another at a bottom end of the core opposite from the end surface to thereby form a U-shaped hairpin connector.

7. The electric machine of claim 1, wherein the first winding assembly further comprises a plurality of extended conductors each disposed in a different one of the slots and extending through the second winding assembly such that ends of the extended conductors define second terminals projecting axially beyond the second winding assembly, further comprising a third winding assembly disposed axially over the second winding assembly and including a plurality of outer bridges, each outer bridge including an arcuate center section extending above and spanning a respective one of the bridges at a third axial level relative to the end surface, first and second necks contiguous with respective first and second ends of the center section and extending therefrom axially away from the end surface, and first and second welding blocks contiguous with the respective necks and welded to the respective second terminals of a pair of the extended conductors at a fourth axial level further from the end surface than the third axial level.

8. The electric machine of claim 7, wherein the plurality of outer bridges is disposed in a ring and the third winding assembly further comprises an electrically non-conductive casing enclosing the ring of outer bridges on a circumferentially outer surface thereof and on a radially inner surface thereof.

9. The electric machine of claim 7, wherein each pair of extended conductors comprises a third conductor disposed at a third radial distance relative to the longitudinal axis and a fourth conductor disposed at a fourth radial distance greater than the third radial distance, and radially adjacent outer bridges are disposed in radially-nested relationship with one another without overlapping one another.

10. A stator for an electric machine comprising:
    a winding assembly comprising a plurality of bridges each including an arcuate center section extending circumferentially over an end surface of a core at a first axial level relative thereto, first and second necks contiguous with respective first and second ends of the center section and extending therefrom axially away from the end surface, and first and second blocks contiguous with the respective necks and connected to the respective terminals of a pair of conductors at a second axial level farther from the end surface than the first axial level, the bridges arranged in mutually radially-nested relationship to each other without overlapping one another.

11. The stator of claim 10, wherein the plurality of bridges is disposed in a ring and the winding assembly further comprises an electrically non-conductive casing enclosing the ring on a circumferentially outer surface thereof and on a radially inner surface thereof.

12. The stator of claim 10 further comprising another winding assembly disposed axially over the winding assembly and including a plurality of outer bridges.

13. The stator of claim 12, wherein each outer bridge includes a generally arcuate center section extending above and spanning a respective one of the bridges.

14. The stator of claim 12, wherein each outer bridge includes first and second necks.

15. The stator of claim 14, wherein each outer bridge includes first and second welding blocks.

16. A stator for an electric machine comprising:
- a core defining a plurality of slots extending parallel to a longitudinal axis of the core;
- a plurality of U-shaped hairpins, each including a first and a second conductor disposed in a respective one of the plurality of slots, first ends of the conductors defining terminals projecting axially beyond a first end surface of the core, and second ends of the conductors adjacent a second axial end of the core being interconnected by end-turns with the conductors of others of the plurality of hairpins; and
- a plurality of bridges, each including an arcuate center section extending circumferentially over the first end surface at a first axial level relative thereto, first and second necks contiguous with respective first and second ends of the center section and extending therefrom axially away from the first end surface, and first and second welding blocks contiguous with the respective necks and welded to the respective terminals of a pair of the conductors at a second axial level farther from the end surface than the first axial level.

17. The stator of claim 16, wherein the plurality of bridges is disposed in a ring, further comprising an electrically non-conductive casing enclosing the ring on a circumferentially outer surface thereof.

18. The stator of claim 16, wherein the plurality of bridges is disposed in a ring, further comprising an electrically non-conductive casing enclosing the ring and on a radially inner surface thereof.

* * * * *